2,828,246

PRODUCTION OF BACITRACIN

Thomas E. Freaney, Terre Haute, Ind., and Leo P. Allen, Omaha, Nebr., assignors to Commercial Solvents Corporation, Terre Haute, Ind., a corporation of Maryland No Drawing. Application July 31, 1956
Serial No. 601,106

3 Claims. (Cl. 195—109)

Our invention relates to a process for production of bacitracin and more particularly it relates to a process for production of bacitracin under such conditions as to give vastly increased yields of bacitracin never previously obtained.

The well-known antibiotic material bacitracin has been produced in the past by cultivation of a bacitracin-producing strain of the organism Bacillus subtilis on an aqueous nutrient medium under aerobic conditions for a period of time ranging from about 1 to 5 days. When employing the known processes, previous producers of bacitracin have been able to obtain yields of bacitracin ranging to about 150 units/ml. of nutrient medium. A unit of bacitracin is defined as the amount, which when diluted 1:1024 in a series of 2-fold dilutions in 2 cc. of beef infusion broth, completely inhibits the growth of a stock strain (Chanin) of Group A hemolytic streptococcus when the inoculum used to seed the tubes is 0.1 cc. of a $10^{-2}$ dilution of an overnight culture of blood broth. One unit bacitracin is also equivalent to 23.8 micrograms of the master standard maintained by the Food and Drug Administration, U. S. Department of Health, Education and Welfare.

We have now discovered a new process for the production of bacitracin whereby we are able to obtain yields over twice as high as any which have previously been obtained. Our new process is convenient, economical and provides a practical method of producing bacitracin in amounts heretofore considered impossible.

Our new process consists essentially of cultivating a bacitracin-producing strain of the organism Bacillus subtilis on an aqueous nutrient medium containing as the essential ingredients, a proteinaceous substance and a carbohydrate in a weight ratio of about 3 to 5 parts protein to one part carbohydrate wherein the total initial concentration of nutrients ranges from about 10 to 14%, a suitable buffer being employed in amounts necessary to maintain the pH within the range from about 6.0 to 8.0 and aerating the medium such that the superficial air velocity ranges from about 9.5 to 17.0 as defined by Wegrich and Shurter, Industrial and Engineering Chemistry, vol. 45, page 1153 (1953).

By producing bacitracin according to our new method, we are able to obtain yields up to about 325 units/ml. which is more than twice the yields ever previously obtained. Such exceptionally high yields of bacitracin make our new process extremely economical particularly since no equipment or process steps in addition to those previously employed are required.

In carrying out our new process, we combine the nutrient ingredients in the aqueous nutrient medium in the conventional manner such that the ratio is from about 3 to 5 parts protein by weight to one part carbohydrate and the total of the two nutrients in the medium is within the range from about 10 to about 14%. In addition, we incorporate a buffer such as calcium carbonate in the medium in order to maintain the pH within the range from about 6.0 to 8.0. The aqueous nutrient medium is sterilized and then inoculated with a bacitracin-producing strain of the organism Bacillus subtilis after which the inoculated medium is incubated until the maximum titer of bacitracin is obtained, air being supplied to the medium such that the superficial air velocity ranges from about 9.5 to about 17.0. Maximum titers are generally obtained in a period of time ranging from about 18 to about 26 hours.

Proteinaceous materials which we can employ include soybean products such as soybean oil meal, cottonseed meal, and peanut meal. Carbohydrates which we can employ include starch, glucose, and sucrose. In carrying out our process, we preferably employ a medium containing 10% by weight soybean oil meal, 2.5% by weight starch, and 0.5% by weight calcium carbonate, the superficial air velocity being about 12.1. Under such conditions we have been able to obtain yields of bacitracin of about 325 units/ml. in a period of 24 hours.

The bacitracin which we produce according to our new process can be recovered from the nutrient medium by any convenient means such as the process described in U. S. Patent 2,567,698. In addition, the bacitracin-containing nutrient medium can be merely dried to obtain a bacitracin-containing material useful as a feed supplement.

The following example is offered to illustrate our invention; however, we do not intend to be limited to the particular proportions, materials, or procedures shown. Rather we intend to include within the scope of our invention all equivalents obvious to those skilled in the art.

Example 1

A 1,230-gallon portion of a medium containing 10% soybean oil meal, 2.50% starch and 0.50% calcium carbonate having a pH of 7.0 was inoculated with a culture of bacitracin-producing bacteria of the Bacillus subtilis group and the inoculated medium incubated for a period of 24 hours with aeration such that the superficial air velocity was 12.1. An assay of the nutrient medium following the fermentation revealed a yield of bacitracin amounting to 323 units/ml.

Now having described our invention, what we claim is:

1. A process for producing bacitracin which comprises cultivating a bacitracin-producing strain of the organism Bacillus subtilis under aerobic conditions on an aqueous nutrient medium containing a total initial concentration of nutrients in the nutrient medium ranging from about 10.0% to 14.0%, the nutrient medium containing from about 3 to 5 parts proteinaceous material to one part carbohydrate and sufficient calcium carbonate to buffer the medium at a pH ranging from about 6.0 to 8.0, the superficial air velocity ranging from about 9.5 to 17.0.

2. In a process for producing bacitracin by cultivating a bacitracin-producing strain of the organism Bacillus subtilis on an aqueous nutrient medium containing soybean oil meal and starch in a ratio of about 4 parts soybean oil meal to 1 part starch and sufficient calcium carbonate to buffer the medium at a pH ranging from about 6.0 to 8.0, the improvement which comprises employing an initial concentration of nutrients in the nutrient medium ranging from about 10 to 14% and a superficial air velocity ranging from about 9.5 to 17.0.

3. A process for producing bacitracin which comprises cultivating a bacitracin-producing strain of the organism *Bacillus subtilis* under aerobic conditions on an aqueous nutrient medium containing a total initial concentration of nutrients in the nutrient medium ranging from about 10.0% to 14%, the nutrient medium containing soybean oil meal and strach in a weight ratio of about 4 parts soybean oil meal to one part starch and sufficient calcium carbonate to buffer the medium at a pH ranging from about 6.0 to 8.0, the superficial air velocity ranging from about 9.5 to 17.0.

References Cited in the file of this patent

UNITED STATES PATENTS 2,524,089    Stubbs et al.    Oct. 3, 1950

OTHER REFERENCES

Innskeep: Industrial and Engineering Chemistry, vol. 43, 7, 1951, pp. 1488–1498.

Bacitracin: Chemical Engineering, June 1953, pp. 282 to 285.

Wegrich et al.: Industrial and Engineering Chemistry, vol. 45, 1953, pp. 1153 to 1160.